(12) United States Patent
Chen et al.

(10) Patent No.: US 6,671,387 B1
(45) Date of Patent: Dec. 30, 2003

(54) WATERMARKING OF A DIGITIZED IMAGE

(75) Inventors: Trista Chen, Hualien (TW);
Wen-Hsing Hsu, 3F, No. 54 Park Ave. II, Science-Based Industrial Park, Hsinchu (TW)

(73) Assignee: Wen-Hsing Hsu, Hsinchu (TW)

( * ) Notice: Subject to any disclaimer, the term of this patent is extended or adjusted under 35 U.S.C. 154(b) by 578 days.

(21) Appl. No.: 09/621,821

(22) Filed: Jul. 21, 2000

(51) Int. Cl.$^7$ .................................................. G06K 9/00
(52) U.S. Cl. ...................................................... 382/100
(58) Field of Search ......................................... 382/100

(56) References Cited

U.S. PATENT DOCUMENTS

| | | | | |
|---|---|---|---|---|
| 5,530,759 A | * | 6/1996 | Braudaway et al. | 380/54 |
| 6,222,932 B1 | * | 4/2001 | Rao et al. | 382/100 |
| 6,272,634 B1 | * | 8/2001 | Tewfik et al. | 713/176 |
| 6,442,284 B1 | * | 8/2002 | Gustafson et al. | 382/100 |
| 6,470,090 B2 | * | 10/2002 | Oami et al. | 382/100 |

OTHER PUBLICATIONS

Ingemar J. Cox et al., "Secure Spectrum Watermarking for Multimedia", IEEE Trans. on Image Processing, 6(12): 1673–1687, Jun. 1997.*

Mitchell D. Swanson et al., "Multi–media Data–Embedding and Watermarking Technologies", Proceedings of IEEE, 86(6); 1064–1087, Jun. 1998.*

R.G. van Schyndel et al., "A Digital Watermark", IEEE International Conf. on Image Processing, ICIP–94., Page(s): 86–90, vol. 2.*

R.B. Wolfgang et al., "A Watermark for Digital Image", IEEE International Conference on Image Processing, Sep. 1996 Page(s): 219–222, vol. 3.*

Wolfgang, R.B.; Podilchuk, C.I.; Delp, E.J. Perceptual Watermarks for Digital Images and Video. Proceedings of the IEEE, vol.: 87 Issue: 7, Jul. 1999, Page(s): 1108–1126.*

Servetto, S.D.; Podilchuk, C.I.; Ramchandran, K. Capacity Issues in Digital Image Watermarking; Image Processing, 1998, ICIP 98. Proceedings. 1998 International Conference on, vol.: 1 , Oct. 4–7, 1998, Page(s): 445–449 vol. 1.*

Moulin, P.; O'Sullivan, J.A.; Information–Theoretic Analysis of Watermarking. Acoustics, Speech, and Signal Processing, 2000. ICASSP '00. Proceedings. 2000 IEEE International Conference on , vol.: 6, 2000 Page(s): 3630–3633 vol. 6.*

Jiang, D.; Weixin X.; Jianping, Y.; Study on Capacity of Information Hiding for Still Images. Signal Processing Proceedings, 2000. WCCC–ICSP 2000. 5th International Conference on , vol.: 2 , 2000 Page(s): 1010–1013 vol. 2.*

* cited by examiner

*Primary Examiner*—Leo Boudreau
*Assistant Examiner*—Hussein Akhavannik
(74) *Attorney, Agent, or Firm*—Bacon & Thomas, PLLC

(57) ABSTRACT

A watermarking method and device to embed a digitized watermark into a digital image file in the spatial domain first performs error correction to enhance the robustness of the digital image. The digital image file is first processed such that capacity of each element of the digital image file is calculated. The capacity represents the highest power of element of the watermark that can be added to the related element of the digital file. Elements to which watermark elements may be added are selected and their addresses are stored. Elements of the watermark file are then inserted into the selected addresses in sequence and the watermark is modulated. After the modulation the digitized watermark is embedded into the digital file by distributing the modulated elements of the watermark into the selected addresses.

10 Claims, 4 Drawing Sheets

| 0 | -1 | 0 |
|---|----|---|
| 0 | 0  | 0 |
| 0 | 1  | 0 |

| 0 | 0 | 0  |
|---|---|----|
| 1 | 0 | -1 |
| 0 | 0 | 0  |

WATERMARKING OF A DIGITIZED IMAGE

FIELD OF INVENTION

The present invention relates to watermarking of a digitized image, especially to a method and device to attach a watermark into a digitized image file in the spatial domain.

BACKGROUND OF INVENTION

In the field of digitized data processing, the term "watermark" indicates adding particular data into a digital data file, so that the particular data, after special treatment, may appear for purposes of indication or certification when it is necessary.

Generally speaking, the requirements for a watermark, which is embedded in a digitized image, include capacity, imperceptibility and robustness, as described below:

Capacity: A preferred watermarking technology is one which is able to add a watermark into a digital file, instead of establishing a separate watermark file in addition to the digital file. A useful watermarking technology shall be able to allocate sufficient space in the digital file in which a digital watermark file containing a substantial amount of data may be embedded or hidden.

Imperceptibility: The watermark data embedded in a digital file shall not be identified or detected by observers who receive, process or observe the digital file or the converted format of the digital file. On the one hand, the watermark may cause damages or distortions to the digital file to be embedded. It is necessary to provide a technology to embed a watermark into a digital file, such that the damages or distortions are not perceptible to human senses. On the other hand, a watermark must be confidential. The watermark may not be perceptible to human senses, whereby detection, decoding, revision or even erase of the watermark may be avoided.

Robustness: Any digital file is subject to data processing such as compression, conversion, transformation and transmission, when it is transmitted, processed and stored. During the processing, noises, data and/or even other watermark will be added into the digital file for all kinds of reasons. A useful watermarking technology shall be able to protect the watermark from damages, destroy or disappearance during the processes, despite the influence of the above-mentioned factors.

Due to the useful functions of watermarks, such as identification and certification, the watermarking technology has been considered of great economic values in $21^{st}$ century wherein digital data may be widely used. Especially when all kinds of media data are unlimitedly reproduced and distributed in the internet, watermarks are useful in the protection of copyrighted works from being unlawfully infringed. It can thus be expected that the watermarking technology will provide enormous contribution to the electronic commerce in the future.

In the field of the watermarking technology, Schyndel et al.'s "least significant bit" (LSB) watermarking technology, which they published in 1994, was recognized as beginner of this field. Schyndel et al. provided an improved watermarking technology by adding an "m-sequence" watermark in the conventional LSB coding of a digital file. This technology provided a method to embed watermark data into the most invisible bits of a digital image file. The watermark data were obtained from an m-sequenced coding. Receiver of the digital file embedded with the watermark may resolve the watermarked file with the same m-sequence coding, such that the watermark may be obtained. In 1996, Wolfgang et al. further provided a 2-dimensional coding for Schyndel et al.'s technology.

When the digital file to be watermarked is an image file, the watermark may be embedded into the image file in its spatial domain or in its transformation domain.

In the conventional art, as watermarking in the spatial domain is concerned, Matsui and Tanaka's watermarking technology is recognized as leading. This technology related to embedding a watermark into a gray leveled image file, a dithered binary image file, a fax image file, a color still image file or a video image file, as follows:

At first, a digital image file is obtained. The difference in gray level between every two adjacent pixels is calculated to generate a matrix of differences in gray levels. A cipher key table containing values of difference in gray levels and their corresponding output codes (0 or 1) is used to generate a matrix of output codes, based on the matrix of difference values.

Later, the watermark is converted into a string of 0's or 1's. The string is converted into a matrix with a format same as or relative to that of the matrix of output codes. A watermark matrix is thus obtained. The watermark matrix is then compared with the matrix of codes. If the values of 0 or 1 at a corresponding position in the two matrixes are different, the difference value at the corresponding position in the matrix of difference values is replaced by a difference value which has the same output code and which position is most close to the difference value represented by said code in the cipher key. After the process, a matrix of difference values embedded with a watermark is obtained. The matrix of differences may be reduced to a watermarked image, while the watermark brings very little distortion to the image.

Receivers of the matrix of difference values or the matrix of the pixel values may use the cipher key table to reduce the watermark. (See Mitchell D. Swanson et al., "Multi-media data-embedding and watermarking technologies", Proceedings of IEEE, 86(6); 1064–1087, June 1998.)

Among the technologies in embedding watermarks into digital files in the transformation domain, the technology disclosed by Cox et al. was recognized as pioneer. See Ingemar J. Cox et al., "Secure spectrum watermarking for multimedia", IEEE Trans. on Image Processing, 6(12): 1673–1687, June 1997. This technology related to watermarking of DCT (discrete cosine transform) processed images.

In Cox et al.'s invention, watermark data are embedded into the middle-band frequencies of a DCT processed image file. The reason why Cox et al. selected the middle band to embed the watermark was partially because greater robustness may be obtained. In the middle band of a DCT image file, the perceptual significance of the image is greater so that damages or distortions to the image because of the watermarking may be tolerable.

In Cox et al.'s invention, the watermark was generated by a Gaussian random number generator. The watermark may be represented by a one dimensional matrix X, X=[x1, x2, . . . xn], wherein xi=0 or 1. A digital file V (V=[v1, v2, . . . , vm]) is embedded with the watermark file X, with the following equation, to obtain a watermarked file V', V'=[v1 ', v2', . . . , vm']

vi'=vi(1+xi α)

wherein i=1, 2, . . . , n; vi' represents DCT coefficients of the watermarked file; vi represents DCT coefficients of the original digital file; xi represents elements of the watermark file generated by the Gaussian random number generator; and a represents a scalar vector.

After the watermarked digital file is received, the original digital file and the watermark file may be obtained by reverse DCT processing of the watermarked file. In other words, the original digital file and the watermarked digital file are both DCT processed. Substrate the watermarked file with the original digital file and a file of DCT coefficients which is similar to the watermark file may be obtained. Reverse DCT process the obtained watermark file and the watermark may be reduced.

After Cox et al.'s invention, several studies were made by researchers in this field and a variety of watermarking technologies in the DCT transformation domain were developed and disclosed.

OBJECTIVES OF THE INVENTION

The objective of this invention is to provide a watermarking method and a watermarking device to automatically embed a watermark into a digital data file.

Another objective of this invention is to provide a systemized watermarking technology to embed a watermark into a digital image file.

Another objective of this invention is to provide a watermarking technology whereby watermark embedded in a digital image file may not be easily detected.

Another objective of this invention is to provide a watermarking technology whereby watermark embedded in a digital image file has a relative high robustness.

SUMMARY OF INVENTION

According to this invention, a watermarking method and device to embed a digitized watermark into a digital image file in the spatial domain is disclosed. In the watermarking technology of this invention, the digitized watermark is first error corrected to enhance its robustness. The digital image file to be embedded with the digitized watermark is first processed such that capacity of each element of the digital image file is calculated. The capacity of an element of the digital image file represents the highest value of tolerance for an element of the watermark to be added to the said element of the digital image file. Elements of the digital image file to which watermark elements may be added are selected and their addresses are recorded. Elements of the watermark file are then inserted into the selected addresses in sequence and the watermark is thus modulated. After modulation the digitized watermark is embedded into the digital file by distributing the modulated elements of the watermark into the selected addresses.

These and other objectives and advantages of this invention may be clearly understood from the detailed description by referring to the following drawings.

DETAILED DESCRIPTION OF THE INVENTION

Figure 1:
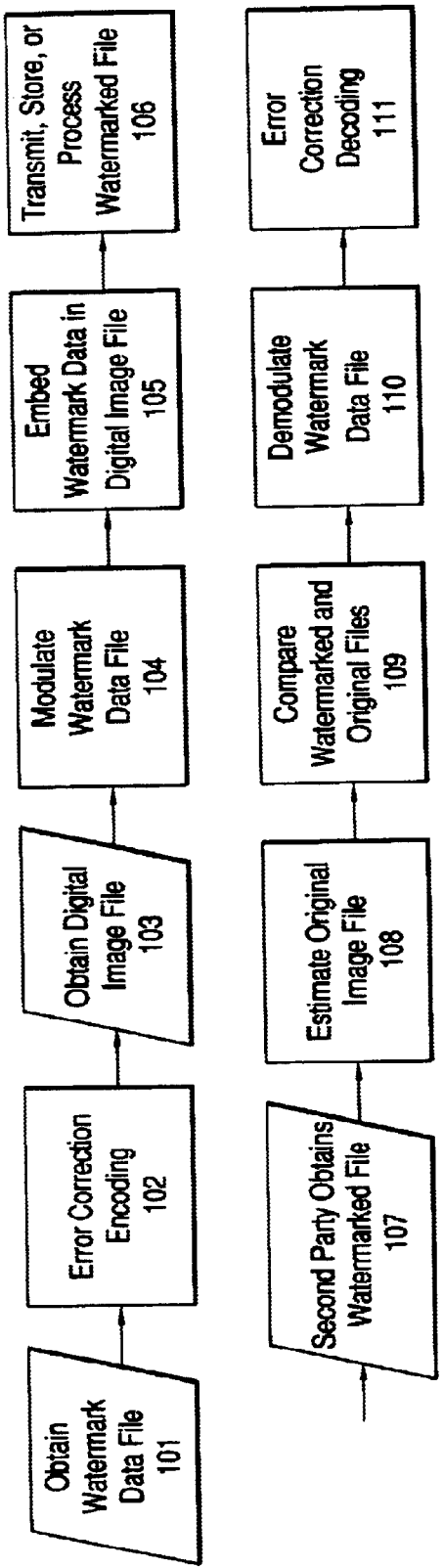
FIG. 1 illustrates the flow chart of the method for watermarking of digitized image of this invention.

FIG. 1 illustrates the flow chart of the method for watermarking of digitized image of this invention. As shown in this invention, in embedding a watermark into a digital image file, at 101 a watermark data file is obtained. If the watermark is a text data file, it may be in a suited format, such as the ASCII format. If it is an image, the file may be a string of gray levels. At 102 the watermark data file is encoded with a error correction encoder, such that the watermark data may be resistant to all kinds of processing such as compression, transmission, storage etc. Here, proper encoder includes the BCH (Bose-Chaudhuri-Hocquenghem) encoder program. Other encoding tools may also be applicable in this invention, as long as they may enhance the error correction rate of the watermark data.

At 103 a digital image file to be embedded with the watermark data is obtained. At 104 the watermark data file is modulated according to the features of the digital image file, such that the watermark data may be embedded to the digital image file. After the modulation, the watermark data file may be in the form of a string. At 105 the watermark data is embedded into the digital image file. The modulation and embedding methods of the watermark data of this invention will be described in detail hereinafter. The embedding of the watermark data includes inserting the pixel data of the watermark data file into selected addresses in the digital image file, in the format and content after the modulation.

At 106 the watermarked image file may be transmitted or stored, or processed with a conventional method. At 107 the watermarked digital image file is obtained by a second party and is subject to processing. If the second party does not have the original, unwatermarked image file, at 108 the original image file is estimated with a suited technology and an image similar to the original image is obtained. The estimation of the original image file is not the core of this invention and may be accomplished with the conventional art, detailed description thereof is thus omitted.

At 109 the watermarked image file as received is subtracted by the estimated image file and the watermark data file is obtained. At 110 the watermark data file is demodulated with the modulator of step 104. At 111 decode the demodulated watermark data file with an error correction decoder and the watermark data file is obtained.

The modulation of the watermark data file is one of the most important features of this invention. The invented modulation technology modulates the watermark data file so that it is suited to be embedded into a digital image file. Detailed description of the modulation technology will be given in the followings. It is noted that the modulation technology of this invention is used to modulate the watermark data such that the watermark data are embedded into the digital image file in its spatial domain.

Although it is not intended to limit the scope of this invention, in designing a watermarking technology, the following factors may be taken for consideration:

1. Capacity: According to this invention, better capacity to contain watermark data in the digital image file may be obtained, if characteristics of the digital image file to be embedded with the watermark are properly utilized. For example, if the digital image file is seen as an information channel and the watermark data are seen as information, it is possible to decide an optimal capacity of information transmission in the information channel and the capacity may be used as capacity of the digital image file to contain the watermark. Here, the watermark is treated as "information". The capacity of a digital image file may be calculated according to the following equation:

$$C = \frac{1}{2} \sum_{i=1}^{n} \log_2\left(1 + \frac{\alpha r_i^2}{\delta_T^2 + \delta_i^2 + 2cor(\delta_i, \delta_T)}\right) \quad (1)$$

wherein C represents the total capacity of the digital image file to contain the watermark data; α represents a factor; γi represents the variation value of the ith pixel of the digital image file which indicates the power variation of the area surrounding the ith pixel; δ T represents power of noise which indicates distortion or added information to the image file during its compression, transmission or store; δi represents the capacity of the ith pixel of the image file, which indicates its capacity to embed the watermark data; cor (δi, δT) represents correlated changes to the ith pixel of the digital image file caused by δi and δT during the processing of the image file.

In the above equation, factors δi and cor(δi, δT) may be omitted. This is because in general applications, the processing (e.g., compression and transmission) and reduction of the digital file are proceeded with the same method and with the reversed steps. Generally speaking, if influences brought by the image processing are ignored, the gray level value of a pixel may be treated as the δi of the pixel.

Now we may give definition of capacity of each pixel of the digital image file, as follows:

$$C(i) = \frac{1}{2}\log_2\left(1 + \frac{r_i^2}{\delta_i^2}\right) \quad (2)$$

Wherein C(i) represents the capacity of the ith pixel of the digital image file.

2. Imperceptibility: In the above equation the variation value of a pixel, i.e. the power of variation in gray values of pixels surrounding a pixel, indicates the capacity of the pixel. In theory, an image file with a greater capacity will be more suited to embed is watermark data into it. However, adjustment factors should be used to adjust the capacity values so to enhance the imperceptibility of the watermark after it is embedded into the digital file. In the above equation, factor a is used to adjust the capacity of the pixels. After the adjustment, requirements in capacity; invisibility and in other conditions may be satisfied.

Figures 3, 4:
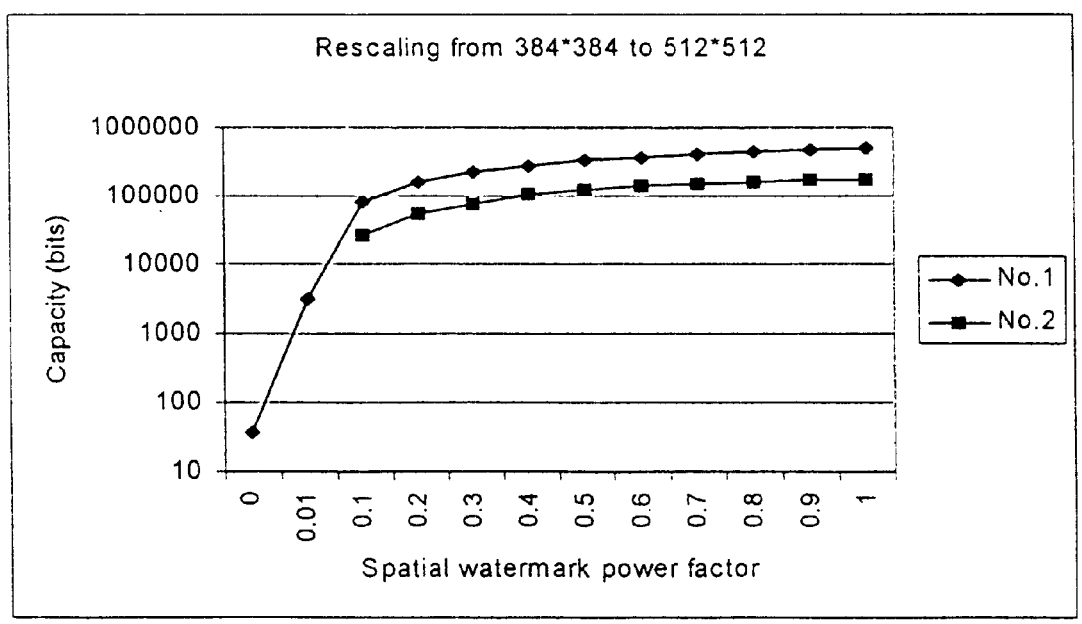
FIG. 3 illustrates two masks used in the calculation of the capacity to contain watermark data of a pixel in a digital image file.
FIG. 4 shows the total capacity and number of pixels with a capacity greater than 1 bit, both of the image file "Lena", calculated according to this invention.

In order to calculate the variation of gray level values surrounding a pixel, masks as shown in FIG. 3(a) and (b) are designed. FIG. 3 illustrates two masks used in the calculation of capacity to contain watermark data of a pixel in a digital image file.

In calculating the capacity of a pixel, the gray level of its adjacent pixels are calculated by a matrix as shown in FIG. 3, by putting the central grid at the pixel to be calculated. The gray level values of a collection of 9 pixels are multiplied by their respective corresponding figures in the mask and sum of all values is output as capacity of the pixel.

According to the above calculation, the capacity of each pixel may be calculated according to one of the following equations, whereby the total capacity of the digital image file may also be obtained:

$$Ci = \log_2\left(1 + \frac{\alpha r_i^2}{\delta_i^2}\right) \quad (3)$$

$$Ci = \log_2\left(\frac{\alpha r_i^2}{\delta_i^2 + \delta_T^2 + cor(\delta_i, \delta_T)}\right) \quad (4)$$

Figure 2:
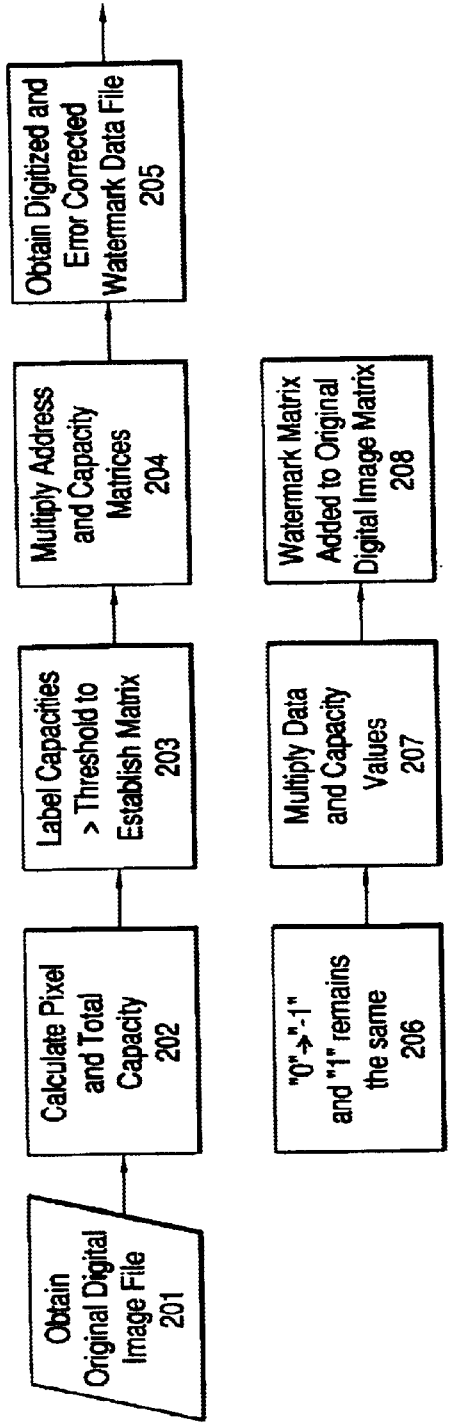
FIG. 2 illustrates the flow chart of the method for modulation of watermark data applicable in this invention.

From the above analysis, it is possible to design an algorithm to modulate the watermark data so that the watermark may be embedded into a digital image file with high capacity and low perceptibility. FIG. 2 illustrates the flow chart of the modulation method for watermark data suited in this invention. As shown in this figure, in the beginning, at 201 an original digital image file is obtained. At 202 the capacity of each pixel of the image file is calculated and the total capacity of the image file is also obtained. In the calculation of the capacity of each pixel and the total capacity of the digital file, equations 1, 2, 3 and 4 are used. Here, the capacity of a pixel indicates capacity of the pixel to contain watermark data. If the digital file is a colored image file, the capacity of each primary color is calculated. In this step, the capacity of each pixel and the total capacity of the image file are stored for further use.

In the preceding step an array or a matrix of capacity is obtained. At 203 capacity values greater than a threshold (such as 1) are labeled and picked up to establish an array or a matrix of capacity values greater than the threshold. This array or matrix may be called the "watermark address matrix". In this step, it is recommendable to select a certain number (such as $2^{12}$) of addresses with the greatest capacity values to establish the watermark address matrix. This watermark address matrix may be used as matrix of addresses wherein watermark data are embedded. Here, the label may be a number of 1, while the unlabeled pixels are filled with 0. At 204 the watermark address matrix (or array) is multipled with the capacity matrix (or array) to obtain a capacity-watermark address matrix. At 205 the digitized and error corrected watermark data file is obtained. At 206 the "0" pixels of the watermark file are changed to "−1" and the "1" pixels of the watermark file remain "1". This contributes to magnify the capacity of the pixels. At 207 values of the watermark data are multiplied in sequence with the capacity values of non-zero pixels of the capacity-watermark address matrix. A watermark matrix or array is thus obtained. Last at 208 the watermark matrix or array is added to the original digital image matrix or array and a watermarked image file is obtained.

EMBODIMENT

The famous "Lena" image (512*512 pixels) is used in the embodiment of this invention, to illustrate how the capacity of pixels of an image and the total capacity of the image file are calculated. The total capacity is indicated, in each of FIGS. 4–7, by data series "No. 1," and the number of pixels with a capacity greater than 1 is indicated by data series "No. 2."

FIG. 4 shows the total capacity and number of pixels with a capacity greater than 1, both of the image file "Lena", as calculated according to this invention. As shown in this figure, it is possible to locate in an ordinary image file sufficient number of addresses with high capacity and low perceptibility, so to embed a watermark.

Figure 5:
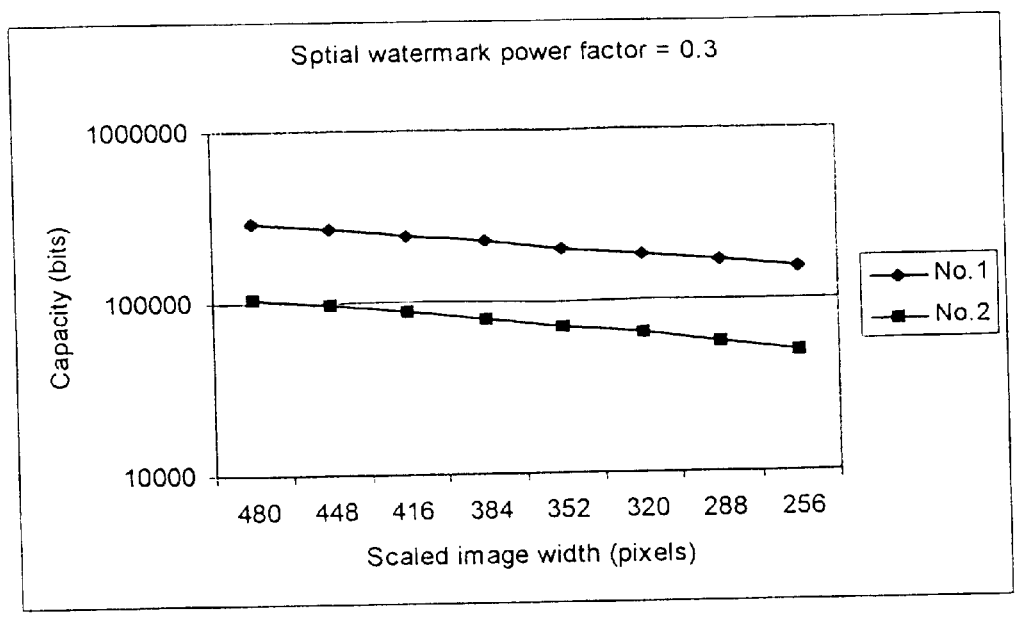
FIG. 5 shows the total capacity and number of pixels with a capacity greater than 1 bit, both of the image file "Lena", calculated according to this invention wherein alpha in Table is 0.3 and wherein the image is scaled to a smaller size.

The image file "Lena" is then scaled to a smaller size and capacity of its pixels is calculated. FIG. 5 shows the total capacity of the scaled image file and number of pixels with a capacity greater than 1 in the image file, when the capacity of the pixels is calculated according to this invention when $\alpha$ is 0.3.

Figure 6:
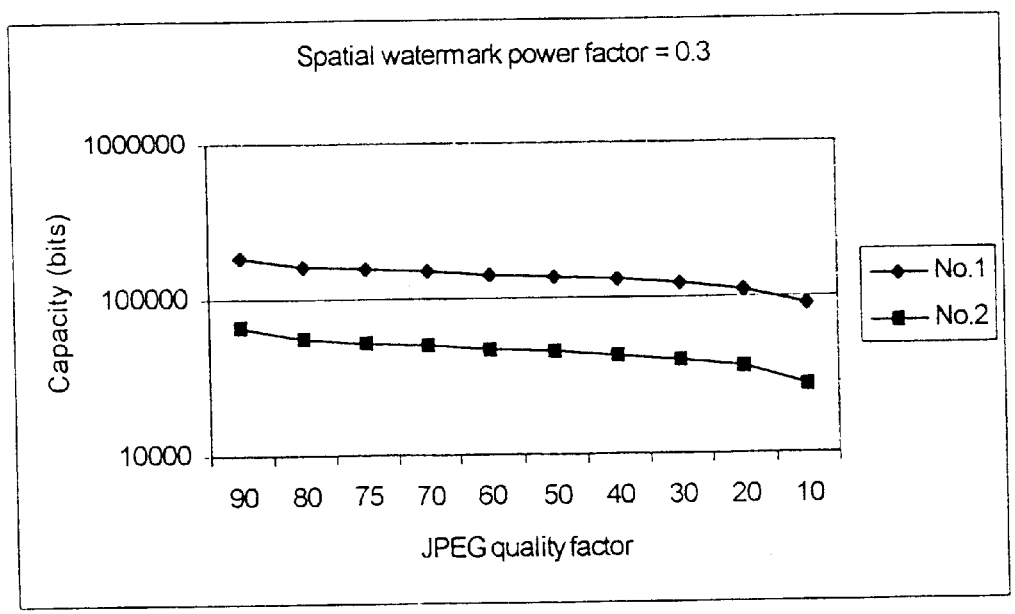
FIG. 6 shows the total capacity and number of pixels with a capacity greater than 1 bit, both of the image file "Lena", calculated according to this invention wherein alpha in Table is 0.3 and wherein the image is compressed under the JPEG standard.

The image file "Lena" is compressed under the JPEG standard. The capacity of its pixels is calculated with the a value of 0.3. FIG. 6 shows the total capacity of the compressed image and number of pixels with a capacity greater than 1 in the image file.

Figure 7:
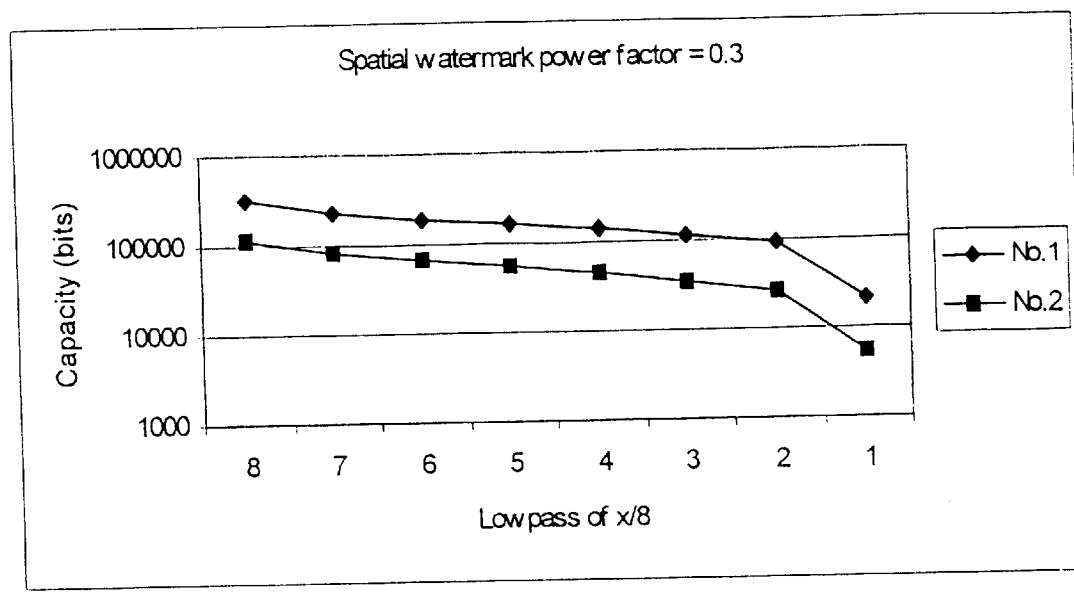
FIG. 7 shows the total capacity and number of pixels with a capacity greater than 1 bit, both of the image file "Lena", calculated according to this invention wherein alpha in Table is 0.3 and wherein the image is filtered with a low-pass filter.

The image file "Lena" is filtered with a low-pass filter. The capacity of its pixels is calculated with the $\alpha$ value of 0.3. FIG. 7 shows the total capacity of the filtered image file and number of pixels with a capacity greater than 1 in the filtered image file "Lena".

As shown in these tables, the watermarking technology of this invention is useful in allocating sufficient number of addresses in an image file at which pixels are of high capacity and low perceptibility, when a watermark data file is embedded thereto. The image file as embedded with the watermark is resistant to a variety of processing, including compressing, scaling and filtering.

As the present invention has been shown and described with reference to preferred embodiments thereof, those skilled in the art will recognize that the above and other changes may be made therein without departing from the spirit and scope of the invention.

What is claimed is:

1. A method to embed a watermark data file into a digital image file, comprising:

obtaining a digital watermark data file and a digital image data file;

calculating, according to perceptual sensibility of human senses, a capacity to contain watermark data of each pixel of said digital image file;

allocating and labeling in said digital image file addresses of pixels which are suited for embedding an element of said watermark data file;

filling elements of said watermark data file into said digital image data file in sequence, at said addresses of pixels in said digital image file which are suited for embedding an element of said watermark data file and with values of said capacity to contain watermark data; and obtaining a digital image file embedded with said watermark data file, wherein said values of capacity to contain watermark data of a pixel is calculated according to the following equation:

$$Ci = \log_2\left(\frac{\alpha r_i^2}{\delta_i^2}\right)$$

wherein Ci represents the capacity to contain watermark data of the ith pixel of said image file, a represents $\alpha$ factor, ri represents a variation power of said ith pixel, and $\delta i$ represents capacity of said ith pixel.

2. The method according to claim 1, wherein ri represents variation in gray level values of pixels surrounding said ith pixel.

3. The method according to claim 2 wherein ri represents difference in gray level values of two adjacent pixels in the vertical direction to said ith pixel.

4. The method according to claim 2 wherein ri represents difference in gray level values of two adjacent pixels in the horizontal direction to said ith pixel.

5. The method according to claim 1 wherein allocating and labeling addresses of pixels which are suited for the embedding of elements of said watermark data file comprises selecting and labeling addresses where Ci values are greater than a threshold value.

6. The method according to claim 1 wherein filling elements of said watermark data file into said digital image data file comprises filling said Ci values into said ith pixel.

7. The method according to claim 1, further comprising a step of embedding into said watermarked image file another watermark data file.

8. A method to embed a watermark data file into a digital image file, comprising:

obtaining a digital watermark data file and a digital image data file;

calculating, according to perceptual sensibility of human senses, a capacity to contain watermark data of each pixel of said digital image file;

allocating and labeling in said digital image file addresses of pixels which are suited for embedding an element of said watermark data file;

filling elements of said watermark data file into said digital image data file in sequence, at said addresses of pixels in said digital image file which are suited for embedding an element of said watermark data file and with values of said capacity to contain watermark data; and obtaining a digital image file embedded with said watermark data file, wherein said capacity to contain watermark data of a pixel in said digital image file is calculated according to the following equation:

$$Ci = \log_2\left(\frac{\alpha r_i^2}{\delta_i^2 + \delta_T^2 + cor(\delta_i, \delta_T)}\right)$$

wherein Ci represents capacity to contain watermark data at the ith pixel in said digital image file; $\alpha$ represents a factor; ri represents variation power of said ith pixel; $\delta T$ represents power of noise brought to said image file; $\delta T$ represents capacity of said ith pixel of the image file; and $cor(\delta i, \delta T)$ represents correlated changes to $\delta i$ and $\delta T$ during the processing of the image file.

9. The method according to claim 8 wherein ri represents difference in gray level values of two adjacent pixels in the vertical direction to said ith pixel.

10. The method according to claim 9 wherein ri represents difference in gray level values of two adjacent pixels in the horizontal direction to said ith pixel.

* * * * *